== 3,055,761 ==
== CORE MOLDING COMPOSITION ==
Ober C. Slotterbeck, Rahway, and Anthony H. Gleason, Westfield, N.J., assignors to Esso Research and Engineering Company, a corporation of Delaware
No Drawing. Filed Sept. 26, 1956, Ser. No. 612,118
7 Claims. (Cl. 106—38.2)

The present invention relates to improved compositions for the casting of metal. In particular, it relates to core and shell molds comprising a mixture of a finely divided inert substance and a butadiene-containing polymer oil.

In the manufacture of hollow castings considerable skill is required to prepare cores having the desired structural and tensile strength properties. The core oil must mix well with the finely divided inert material which is the major ingredient in the core, coating it so that the resulting product is of uniform density. The oil should not create a product which is sticky and tends to gum up the mold, nor should it cause the core to swell or crack when baked. The binder must impart a sufficient strength to the core to permit handling of the core before it is baked. An extremely important property of core oils is that they must bake quickly and yet not burn out until the hot metal has been poured and has cooled to such an extent that it will retain the shape of the core. On the other hand, the binder must disintegrate sufficiently after the metal has been poured to permit easy removal of the core from the casting.

In the past, it has been common to use linseed oil, fish oil, etc. as core oils; and because of its ready availability, low cost and the fact that it makes satisfactory product, sand has been the most widely used inert material in cores. If desired, other substances, such as clay, fluid coke, alumina, etc., may be used in lieu of sand. The mixture of core oil and inert material is generally baked in a ventilated oven at a temperature between about 350° and 600° F. for from a few minutes to about a few hours. Any volatile materials, such as mineral solvents, present in the oil are removed when the core is baked.

It has now been discovered that certain synthetic polymer oils, such as those prepared by polymerizing butadiene with styrene, make excellent core oils. Furthermore, it has been found that treating these polymer oils with an oxygen-containing substance, such as air or oxygen gas, produces a core oil having outstanding baking properties.

The synthetic oils to which the present invention is applicable are polymers of butadiene, isoprene, dimethyl butadiene, piperylene, methyl pentadiene or other acyclic conjugated diolefins having four to six carbon atoms per molecule. Instead of polymerizing any of the aforesaid diolefins alone, they may be copolymerized in admixtures with each other or in admixtures with minor amounts of ethylenically unsaturated monomers copolymerizable therewith, e.g. with 0 to 40% of unsaturated cyclic compounds having an ethylene group attached to the ring, such as styrene, styrenes having alkyl groups substituted on the ring such as para methyl styrene, dimethyl styrene or diethyl styrene, etc. Also similar amounts of acrylonitrile, methacrylonitrile, methyl acrylate, methyl methacrylate, vinyl isobutyl ether, methyl vinyl ketone, and isopropenylmethyl ketone may be employed. Such synthetic oils may be advantageously prepared by mass polymerization either in the presence of a hydrocarbon soluble peroxide catalyst such as benzoyl peroxide or cumene hydroperoxide, or in the presence of an alkali metal, such as sodium, when the monomers consist of a diolefin or of a mixture of an acyclic diolefin with a styrene compound. It is preferred to use about 15 to 25 wt. percent styrene or alkyl substituted styrene and about 75 to 85 wt. percent butadiene-1,3 in preparing the polymer oil.

The polymerization is conducted in the presence of an alkali metal catalyst at a temperature between about 20 and 100° C. A suitable method, employing sodium as the catalyst is as follows: 80 parts of butadiene-1,3, 20 parts of styrene, 200 parts of straight run mineral spirits boiling between about 300 and 400° F., such as Varsol which contains about 30 vol. percent aromatics, 37 vol. percent naphthenics and 33 vol. percent paraffins, 40 parts of dioxane, 0.2 part of isopropanol and 1.5 parts of finely dispersed sodium are heated at about 50° C. in a closed reactor provided with an agitator. Complete conversion is obtained in about 4.5 hours whereupon the catalyst is destroyed by adding an excess of isopropanol to the polymerized charge. The crude product is cooled, neutralized with carbon dioxide or acetic acid or other organic acid and filtered. Instead of neutralizing the alcohol treated product, the acid may also be added directly to the crude product containing residual metallic sodium and the latter destroyed by the acid. The colorless filtrate is then fractionally distilled to remove the alcohol and modifiers such as dioxane. Finally, additional hydrocarbon solvent is preferably distilled off until a product containing about 40 to 100% non-volatile matter (NVM) is obtained.

Again it will be understood that the described sodium polymerization method may be varied considerably, as by omitting the styrene co-reactant; or by adding the styrene only after the polymerization of butadiene monomer has begun; or dioxane may be replaced by 10 to 35 parts of another ether modifier having 3 to 8 carbon atoms such as methyl ethyl ether, dibutyl ether or ethylal; or the modifier may be omitted altogether, especially when it is not essential to obtain a perfectly colorless product. Similarly, isopropanol is not necessary, though aliphatic alcohols of less than 6 carbon atoms generally have the beneficial effect of promoting the reaction when present in amounts ranging from about 2 to 50% based on the weight of catalyst. Furthermore, the mineral spirits may be replaced by other inert hydrocarbon diluents boiling between about −15° C. and 250° C., preferably between 60 and 200° C., e.g., butane, benzene, xylene, naphtha, cyclohexane and the like. The diluents are usually used in amounts ranging from 50 to 500 parts per 100 parts of monomer. The reaction temperature should be between about 40° C. and 100° C. preferably around 65 to 85° C. As a catalyst, 0.1 to 10 parts of dispersed alkali metal is used per 100 parts of monomers, catalyst particle sizes below 100 microns being particularly effective.

The polymers produced by the above process have molecular weights of about 5,000 to 20,000, preferably about 10,000 to 15,000, viscosities up to 22 poises at 50% N.V.M. and are pale yellow to colorless liquids.

The oxidation treatment, used in one embodiment of this invention, is best carried out in the presence of a solvent. Examples of suitable solvents include hydrocarbons having boiling points up to about 400° F. A particularly suitable solvent is a mineral spirit having an aromatic content of about 50% or more, such as Solvesso 100 which is a trade-name for a solvent containing about 96% aromatics.

Catalysts suitable for the oxidation reaction of this invention include organic salts of metals, such as the naphthenates, octoates and other hydrocarbon soluble metal salts of cobalt, lead, iron and manganese. These catalysts are used in small amounts. Peroxides, such as benzoyl peroxide and the like, may be added to reduce the induction period.

In practicing a specific embodiment of this invention, polymer oil, say a copolymer oil composed of 80 wt. percent butadiene and 20 wt. percent styrene, is charged into a vertical tank having near the bottom thereof a porous thimble or distributing plate. Oxygen-containing gas is bubbled through the oil solution, containing 65% by weight Solvesso 100 at a moderate rate for about 1 to 2 hours at a temperature between about 20 and 150° C. preferably between 100 and 130° C. A polymer oil containing about 0.05 to 12 wt. percent oxygen is recovered.

It is understood that conditions of temperature and time of reaction, ratio of reactants, degree of dilution, presence or lack of solvents and the like will depend upon factors including the degree of oxidation desired and the nature of the starting polymer; therefore, it is not intended that the invention be limited by the specific conditions and examples herein set forth as it is intended to illustrate and not limit the invention.

The nature of the oxidized diolefin polymer depends largely upon the extent to which the oxidation is carried. The degree or extent of oxidation in turn depends on various factors including time of oxidation, temperature, presence or absence of catalysts, type of solvents, etc. In general, a greater extent of oxidation results in less solubility of the oxidized polymer in paraffin hydrocarbon solvents. The oxidation can be carried out such that the product is soluble in paraffinc hydrocarbons indicating that the oxidation has proceeded to a relatively slight extent. The oxidation can also be carried out so that the product is insoluble in paraffinc solvents, but is soluble in aromatic solvents indicating that the oxidation has proceeded to a high degree. The percent of oxygen in the product will vary according to the conditions employed from a trace to 12% or more e.g. about 0.05 to 15%.

In another embodiment of this invention the polymer oil is combined with between about 0.01 and 2.5 wt. percent of an anhydride of an unsaturated dicarboxylic acid, such as maleic, chloro-maleic or citraconic anhydride, by heating the oil and anhydride to a temperature between 50 and 250° C. for from 15 minutes to 2 hours. The polymer oil so produced gives similar results to the oxygen-treated polymer.

The core oils and core compositions of the present invention are prepared by mixing and kneading about 0.5 to 8 parts by wt. of a synthetic polymer oil, such as a copolymer of butadiene and styrene, dissolved in a hydrocarbon solvent with 100 parts by weight of a finely divided (40 to 200 mesh) inert substance, such as sand or fluid coke. If desired a small amount, that is between about 0.02 and 0.4 part by wt., of cobalt, lead, iron or manganese salts, per 100 parts of polymer solids, may be added during this step. A small quantity of water, for instance, 1 to 3 parts by wt., may be blended into the core composition together with or after adding the polymer oil. The resulting blend is then molded into the desired form and placed in a ventilated oven to be baked for about 30 to 200 minutes at a temperature between about 350 and 450° F. At the end of the baking period the core is removed from the oven and used to manufacture hollow castings, such as engine blocks and the like. When the casting takes place the temperature of the metal is quite high, ranging from about 1200° F. for aluminum to about 3000° F. for iron. The binder is of such a nature that it commences to break down immediately after the metal is poured so that the core is easily shaken free of the cast metal product.

The following examples are given to permit a better understanding of the present invention and it is not intended that the invention be limited thereto. The core formulations, hereinafter referred to, are in parts by weight and the core oil weight refers to the amount of non-volatile matter (NVM) in the oil and not the total composition.

In each example the cores were prepared as follows:

| Ingredient: | Parts |
|---|---|
| Michigan city lake sand | 100 |
| Core oil | 1 |
| Water | 3 |

The core oil was mixed with the sand by hand for about 3 minutes and then the water was added with mixing, and the blend was mixed for an additional 3 minutes. Standard dumbbells, having a 1 square inch cross-sectional area, were formed with each composition and baked in a standard Dietert laboratory oven at 390 to 400° F. for set periods of time. Each test sample was broken in standard Dietert tensile testing equipment and the tensile strength was recorded.

EXAMPLE 1

A core composition was prepared according to the general procedure above using a core oil which comprised a polymer oil prepared by polymerizing 80 grams of butadiene-1,3 and 20 grams of styrene in the presence of 300 grams of Solvesso 100, 2 grams of metallic sodium, 30 grams of dioxane-1,4 and 0.3 gram of isopropanol at 50° C. until 100% conversion was obtained. The sodium catalyst was quenched with acetic acid and the product was filtered and stripped to 44% NVM. Solvesso 100 is a solvent containing about 96% aromatics and has an initial boiling point of 320° F. and a final boiling point of 360° F., a specific gravity (60/60° F.) of 0.87 and a Kauri-Butanol value of 91. The polymer recovered had a viscosity of 1.0 to 1.5 poises in 50% Varsol, a trade name for a mineral solvent having an API of 44, a boiling range of 322 to 404° F. and a 42 to 46 Kauri-Butanol value, and a Staudinger molecular weight between 10,000 and 15,000. 1000 grams of sand, 23 grams of the 44% NVM polymer oil and 30 cc. of water were used to prepare the core according to the procedure outlined above. A control core composition (75% NVM) was prepared in the same manner using 2 parts by wt. clay treated polymer and 1 part by wt. raw linseed oil in place of the butadiene-styrene polymer oil. The polymer is a polymer obtained by clay treating a highly olefinic feed stream, boiling from 50 to 500° F., at a temperature between 250 to 300° F. It has a Staudinger molecular weight between 250 and 320 and a viscosity at 210° F. of about 156 seconds in the Saybolt Universal Viscometer. The results of the study are set forth in Table I:

*Table I*

| Core Oil | Solvent | Baking Temp., ° F. | Tensile Strength, p.s.i. After Baking for— | |
|---|---|---|---|---|
| | | | 30 Min. | 60 Min. |
| Clay Treated Polymer, Raw Linseed Oil | Varsol | 390 | 62 | 190 |
| Butadiene-Styrene Polymer Oil | Solvesso 100 | 400 | 386 | 360 |

The data show that the polymer oil produced a fast baking core having an outstanding tensile strength. The baking time for this type of core is very short as indicated by the fact that after only 30 minutes' baking the core had reached its maximum tensile strength, while on the other hand, the conventional linseed oil-clay treated polymer core composition had not reached its maximum strength after 30 minutes.

EXAMPLE 2

A sample of the 80 wt. percent butadiene-20 wt. percent styrene polymer oil used in Example 1 was treated with air in the presence of a catalyst. The polymer oil dissolved in Solvesso 100 (40% NVM) was circulated through a tower at a temperature of 240° F. and a rate of 900 cc./min. Air was bubbled countercurrently through the oil at the rate of 1,000 cc./min. for 6 hours. The treated product contained 9.7 wt. percent oxygen, and had a Gardner color value of 7.

1000 grams of sand, 23 grams of the air-blown oil and 30 cc. of water were compounded according to the general procedure outlined above and evaluated for tensile strength.

*Table II*

| Core Oil | Baking Temp., °F | Tensile Strength, p.s.i. After Baking for— | |
|---|---|---|---|
| | | 30 Min. | 60 Min. |
| Air-Blown Butadiene-Styrene Polymer Oil | 400 | 424 | 399 |

The results of the tensile strength study show that by treating the polymer oil with oxygen it produces a faster baking core as well as one having greater strength than untreated oils. Therefore, it is preferred to use oils which have been treated with oxygen, especially those containing a substantial amount of oxygen, that is about 5 to 12 wt. percent.

It is not intended that the present invention be limited to the examples given above because they merely serve toi llustrate the discovery. Resort may be had to various modifications of the present invention without departing from the spirit thereof or scope of the appended claims. Such a modification could be the use of a mixture of polymer oil and linseed oil as the binder.

What is claimed is:

1. A core molding composition with increased tensile strength comprising 100 parts by weight of a finely divided sand and about 0.5 to 8 parts by weight of a polymer oil prepared by polymerizing an acyclic conjugated diolefin having 4 to 6 carbon atoms in the presence of a sodium catalyst and treating the resulting polymer with a sufficient amount of an oxygen-containing gas to shorten the core's baking time.

2. A core molding composition with increased tensile strength comprising 100 parts by weight of a finely divided sand and about 0.5 to 0.8 parts by weight of a partially oxidized polymer oil having a Staudinger molecular weight between about 5,000 and 20,000 and prepared by polymerizing 60 to 100 wt. percent of an acyclic conjugated diolefin having 4 to 6 carbon atoms and up to 40 wt. percent of a vinyl aromatic compound in the presence of a sodium catalyst and treating the polymer with an oxygen-containing gas.

3. A core molding composition according to claim 2 in which the amount of oxygen in the polymer oil is between about 0.5 and 15 wt. percent.

4. A core molding composition according to claim 2 in which the vinyl aromatic compound is styrene.

5. A core molding composition according to claim 2 in which the polymer oil is prepared by polymerizing about 80 wt. percent butadiene-1,3 and 20 wt. percent styrene.

6. A core mold composition with increased tensile strength comprising 100 parts by weight of finely divided sand and about 0.5 to 0.8 parts by weight of a partially oxidized polymer oil having a Staudinger molecular weight of about 5,000 to 20,000 which is prepared by copolymerizing butadiene-1,3 and styrene in the presence of a sodium catalyst and treating the resulting polymer with an oxygen-containing gas.

7. A process for preparing a core molding composition which comprises mixing and kneading 100 parts by weight of a finely divided, inert material with about 0.5 to 8 parts by weight of a polymer oil composed of 60 to 100 wt. percent of an acrylic conjugated diolefin and up to 40 wt. percent of a vinyl aromatic compound which has been prepared in the presence of a sodium catalyst and which has been treated with an oxygen-containing gas; molding the mixture; baking the resulting molded mixture for about 30 to 200 minutes at a temperature between about 350° and 450° F.; and recovering a core with a tensile strength of at least 360 p.s.i. suitable for use in the manufacture of hollow castings.

References Cited in the file of this patent

UNITED STATES PATENTS

| 2,047,297 | Stahl | July 14, 1936 |
| 2,701,780 | Nelson et al. | Feb. 8, 1955 |
| 2,762,851 | Gleason | Sept. 11, 1956 |
| 2,765,507 | Wolf et al. | Oct. 9, 1956 |